United States Patent [19]

Garde

[11] 3,767,905

[45] Oct. 23, 1973

[54] ADDRESSABLE MEMORY FFT PROCESSOR WITH EXPONENTIAL TERM GENERATION

[75] Inventor: Douglas Garde, Woburn, Mass.

[73] Assignee: Solartron Electronic Group Ltd., Farnborough, England

[22] Filed: May 12, 1971

[21] Appl. No.: 142,586

[52] U.S. Cl. .......... 235/156
[51] Int. Cl. .......... G06f 7/38, G06f 15/34
[58] Field of Search .......... 235/156, 164

[56] References Cited

UNITED STATES PATENTS

| | | | |
|---|---|---|---|
| 3,517,173 | 6/1970 | Gilmartin, Jr. et al. | 235/156 |
| 3,584,781 | 6/1971 | Edson | 235/156 |
| 3,591,784 | 7/1971 | Cutter | 235/152 |
| 3,601,592 | 8/1971 | Cutter | 235/156 |

*Primary Examiner*—Charles E. Atkinson
*Assistant Examiner*—David H. Malzahn
*Attorney*—William R. Sherman, Stewart F. Moore, Jerry M. Presson, Leonard R. Fellen and Roylance, Abrams, Berdo & Kaul

[57] ABSTRACT

The fast Fourier transform is a known algorithm which can be written:

$$A_l\,(b_{m-1}\,b_{m-2}\cdots b_{m-l}\cdots b_1\,b_0) = 1/c[A_{l-1}\,(b_{m-1}\,b_{m-2}\ldots 0\ldots b_1b_0) + A_{l-1}\,(b_{m-1}\,b_{m-2}\ldots 1\ldots b_1b_0)\ \text{Exp.}\,(2\pi i\theta')]$$

where $\theta'$ is in radians/$2\pi$ and is given by $$\theta' = \pm\,(b_{m-1}\,2^{-L} + b_{m-2}\,2^{-l+1} + \ldots + b_{m-l}\,2^{+1});$$

where $A_o$ is the set of $N = 2^m$ input data points identified by $m$ indices $b_{m-1}$ to $b_o$ and where $b_{m-l} = 0$ or 1. The computation proceeds in a series of levels 1 . . . $l$ . . . $m$ at each of which the above equation represents $2^{m-1}$ equations corresponding to all different combinations of bits $b$ other than $b_{m-1}$. The terms $A_l$ become complex. $A_{m-l}$ gives the required terms of the Fourier series. This algorithm is engineered economically by subjecting the terms $a_{l-1}$ ( . . . 1 . . . ) to vector rotation through the angle $2\,\pi\,\theta$, where $\theta = \pm\,(\theta' - ½)$, and then adding and subtracting them from the terms $A_{l-1}$ ( . . . 0 . . . ) to generate $A_l$ ( . . . 1 . . . . ) and $A_l$ ( . . . 0 . . . ). To avoid the need for a large look-up store giving all required values of sin $\theta$ and cos $\theta$, as is necessary in direct vector rotation, the rotation is effected by so-called CORDIC computation (pseudo-multiplication). If the vector $A_{l-1}$ ( . . . 1 . . . ) to be rotated is represented as $X + iY$, it can be shown that the operator $$\prod_{j=0}^{p-1} (1+ia_j2^{-j})$$

$$Ke^{2\pi i\theta'}$$

is equivalent to the operator $Ke^{2}$ $^{i}$ where $K$ is a readily removed constant of multiplication and $$2\pi\theta'' = \pm 2\pi\left(\theta - \frac{1}{4}\right) = \sum_{j=0}^{m-1} a_j \tan^{-1} 2^{-j};$$

Thus the required angle of rotation $\theta$ (in radians/$2\pi$)

$= b_{m-1}\,2^{-l} + b_{m-2}\,2^{-l+1} + \ldots + b_{m-l+1}\,2^{-2}$ is stored, the vector X + iY, after an initial 90° rotation step, is multiplied by successive terms $1 + iaj\,2^{-j}$, and $a_j \tan^{-1} 2^{-j}$ is added to or subtracted from the stored angle, in accordance with whether $a_j$ is +1 or −1 and the value of $a_j$ is changed from the existing to the other value when the stored angle goes through zero. A look-up store for $\tan^{-1}2^{--j}$ is required but only five words have to be stored because, for $j>l$, $\tan^{-1}2^{-j}$ is approximated sufficiently closely by $2^{-j}$.

11 Claims, 6 Drawing Figures

Figure 1:
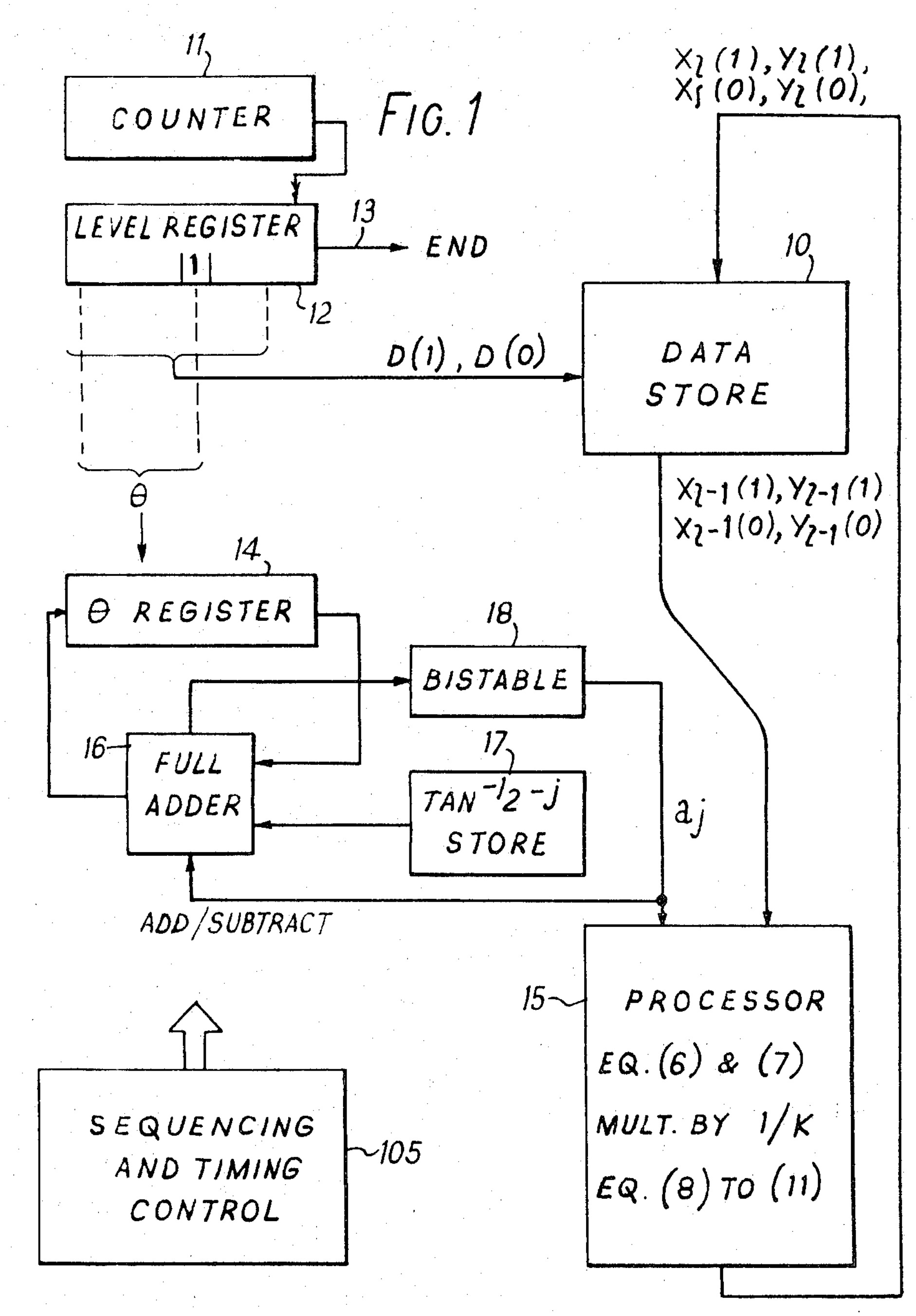

United States Patent [19] [11] 3,767,905
Garde [45] Oct. 23, 1973
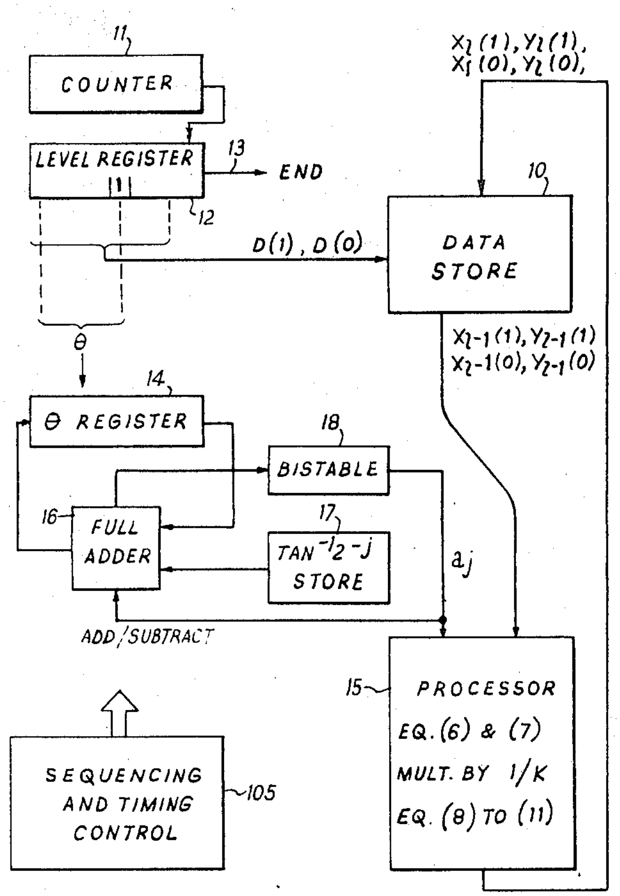

ADDRESSABLE MEMORY FFT PROCESSOR WITH EXPONENTIAL TERM GENERATION

This invention relates to a special purpose digital computer for implementing the fast Fourier transform which is an algorithm brought into prominence by a paper: J. W. Cooley and J. W. Tukey "An algorithm for the machine calculation of complex Fourier series" *Mathematics of Computation*, vol. 19, pp. 297–301, April 1965. The direct application of the equations of the complex Fourier series involves $N^2$ operations (complex multiplication followed by addition) where there are N terms in the series, i.e., N data points. If $N = 10^3$ there are $10^6$ operations. The fast Fourier transform eliminates the redundancy which arises if N is a product of several factors (when certain symmetries appear in the equations) and the case of particular interest to digital computation is when $N = 2^m$. The number of operations is then reduced to $N \cdot \log_2 N$, i.e., $m \cdot N$. If $N = 2^{10}$ (approximately $10^3$) the number of operations is only 10,240. Since the operations can be grouped in pairs involving the same complex multiplication and if the input data is loaded such that the spectral folding redundancy is avoided, then the number of operations reduces to 2,560.

The fast Fourier transform can be programmed on a general purpose computer but it has been shown that this is an inefficient technique and proposals have been made for special purpose computers. See for example, R. R. Shively "A Digital Processor to Generate Spectra in Real Time" *IEEE Transactions on Computers* vol. C-17. No. 5, May 1968. The object of this invention is to provide a greatly simplified special purpose computer.

The input data can be represented by N terms of the form $A_0(b_{m-1}\, b_{m-2} \ldots b_1\, b_0)$ where $b_{m-1}$ to $b_0$ are $m$ bits of the address code for the terms. The computation proceeds in a series of levels whereby the terms $A_1$, $A_2$, $A_3 \ldots A_m$ are calculated, the terms of a general level being represented as $A_l$. The algorithm can be written $$A_l\,(b_{m-1}\, b_{m-2} \ldots b_{m-l} \ldots b_1 b_0) = 1/c\,[A_{l-1}\,(b_{m-1}\, b_{m-2} \ldots 0 \ldots b_1 b_0) + A_{l-1}\,(b_{m-1}\, b_{m-2} \ldots 1 \ldots b_1 b_0)\ \text{Exp.}\ (2\pi i\theta')] \quad (1)$$

where $\theta'$ is in radian/$2\pi$ and is given by $$\theta' = \pm(b_{m-1}2^{-l} + b_{m-2}2^{-1+1} + \ldots + b_{m-l}2^{-1}) \quad (2)$$

and where $b_{m-l} = 0$ or 1.

These latter alternatives thus enable two terms $A_l$ to be computed from the corresponding $A_{l-1}$, the convention in equation (1) being that the bits $b$ other than $b_{m-l}$ are the same in all three terms of the equation. There are thus $2^{m-1}$ equations (1) for each level, corresponding to all different combinations of bits $b$ other than $b_{m-l}$. The final terms $A_m$ are (subject to a re-ordering process which is known and with which the present invention is not concerned) the required terms of the Fourier series.

Each application of equation (1) in effect requires the vector $A_{l-1}(\ldots 1 \ldots)$ to be rotated by the angle $\theta$ (whose two different values for $b_{m-l} = 0$ or 1 merely differ by 180°) and then added to $A_{-l1}(\ldots 0 \ldots)$.

It will in fact be more convenient to rewrite equation (1) as equations (3) and (4) using a more condensed notation:

$$A_l\,(1) = 1/c\,[A_{l-1}\,(0) - A_{l-1}\,(1)\ \text{Exp}\ (2\pi i\theta)] \quad (3)$$

$$A_l\,(0) = 1/c\,[A_{l-1}\,(0) - A_{1-1}\,(1)\ \text{Exp}\ (2\pi i\theta)] \quad (4)$$

where $\theta$ is given by equation (5) for both equations (3) and (4)

$$\theta = \pm\,[b_{m-1}2^{-l} + b_{m-2}2^{l+1} + \ldots + b_{m-1+1}2^{-2}] \quad (5)$$

It will be appreciated that, in all the equations herein $\theta$ is an angle expressed in radians $/2\pi$.

The vector rotation involves a complex multiplication which has been effected in previous proposals on the basis of the following equations:

$$\text{If } X^1 + iY^1 = (X + iY)\ \text{Exp}\ (2\pi i\theta)$$
$$\text{then } X^1 = X \cos 2\pi\theta - Y \sin 2\pi\theta$$
$$\text{and } Y^1 = X \sin 2\pi\theta + Y \cos 2\pi\theta.$$

Each operation thus involves four multiplications and, what is more, a large store is necessary to provide the requisite values of sin 2 $\theta$ and cos 2 $\theta$. It is not satisfactory, on considerations of speed, to calculate the cos and sin values each time they are required. The present invention requires only two multiplications for each operation and only a small store is necessary.

According to the present invention a special purpose digital computer for implementing the fast Fourier transform comprises a data store for the real and imaginary parts $X_{l-1}$ and $Y_{l-1}$ of the terms $A_{l-1}$, an address register for storing the address of a term, means for causing the stored address to progress cyclically through all values thereof during each level of computation, a level register for storing a bit identifying the level $l$ of the computation, means responsive to each stored address and the level bit to extract the values $X_{l-1}$ (1), $Y_{l-1}$ (1), $X_{l-1}$ (0) and $Y_{l-1}$ (0) and to determine the value of $\theta$ from the $l$ most significant bits of the stored address, means for affecting vector rotation of said values $X_{l-1}$ (1) and $Y_{l-1}$ (1) through an angle having said value of $\theta$, said vector rotation effecting means including means adapted to operate iteratively upon the values $X_{l-1}$ (1) and $Y_{l-1}$ (1) to compute values $KX_{1-1}$ (1) and $KY_{l-1}$ (1), where $K$ is a constant and $X^1 + iY^1 = (X + iY)$ Exp $(2\pi i\theta)$, said iterative operations being of the form $$X_{j+1} = X_j + a_j\, 2^{-j} Y_j \quad (6)$$

$$Y_{j+1} = Y_j - a_j\, 2^{-j} X_j \quad (7)$$

where the multipliers $a_j$ change between +1 and −1 so $$\left(\theta - \frac{1}{4}\right) + \sum_{j=0}^{p-1} a_j \tan^{-1} 2^{-j}$$

tends towards zero, means adapted to remove the constant K to derive $X'_{l-1}$ (1) and $Y'_{l-1}$ (1), and means adapted to perform the following additions and subtractions:

$$X_l(0) = X_{l-1}(0) + X'_{l-1}(1) \quad (8)$$

$$Y_l(0) = Y_{l-1}(0) + Y'_{l-1}(1) \quad (9)$$

$$X_l(1) = X_{l-1}(0) - X'_{l-1}(1) \quad (10)$$

$$Y_l(1) = Y_{l-1}(0) - Y'_{l-1}(1) \quad (11)$$

The said iterative operations effect the vector rotation by a known technique, referred to as cordic computation and described, for example, in a paper by J. E. Volder entitled "The CORDIC Trignometric Computing Technique" in IRE Trans. on Electronic Computer, September 1959, pages 330 to 334. The application of this technique in the computer according to the invention enables a very small read only store to be employed since it is necessary to store only a series of values $\tan^{-1}2^{-0}$, $\tan^{-1}2^{-1}$, etc.

Each of the iterative operations introduces a multiplication by a constant amount, i.e., it is not a pure vector rotation, and at the end of the P iterative operations the cumulative effect is multiplication by the aforementioned constant K. A convenient way to remove this constant is to multiply by 1/K and a simple procedure for doing this will be described subsequently.

In a development of the invention the size of the read only store is further reduced by storing only the first few $\tan^{-1}$ values, e.g., the first six values. This is possible because the tangent of an angle approaches the angle (in radians) at small angles and for $j > 5$ $\tan^{-1}2^{-j} \approx 2^{-j}$. In the embodiment described below the actual hardware implementation is to make $\tan^{-1}2^{-j} = 1/2 \tan^{-1}2^{-j+1}$ for $j>5$.

It is preferred to base the computer upon serial shift register techniques both because these facilitate performance of many of the required operations. Nevertheless parallel techniques can be used if required.

Although one embodiment of the invention will be described in a fair amount of detail, two points should be noted. A full description of the circuits which time the various operations in the correct sequence is not given. Such a description would merely be tedious and would not add to an understanding of the invention. The necessary techniques are well known in digital data processing equipment in general. Secondly there are many possibilities for modifying the details of the computer. Within the scope of the invention as defined it is possible to modify both the details of the mathematical operations employed and the form of circuits used to perform the operations.

Figure 2:
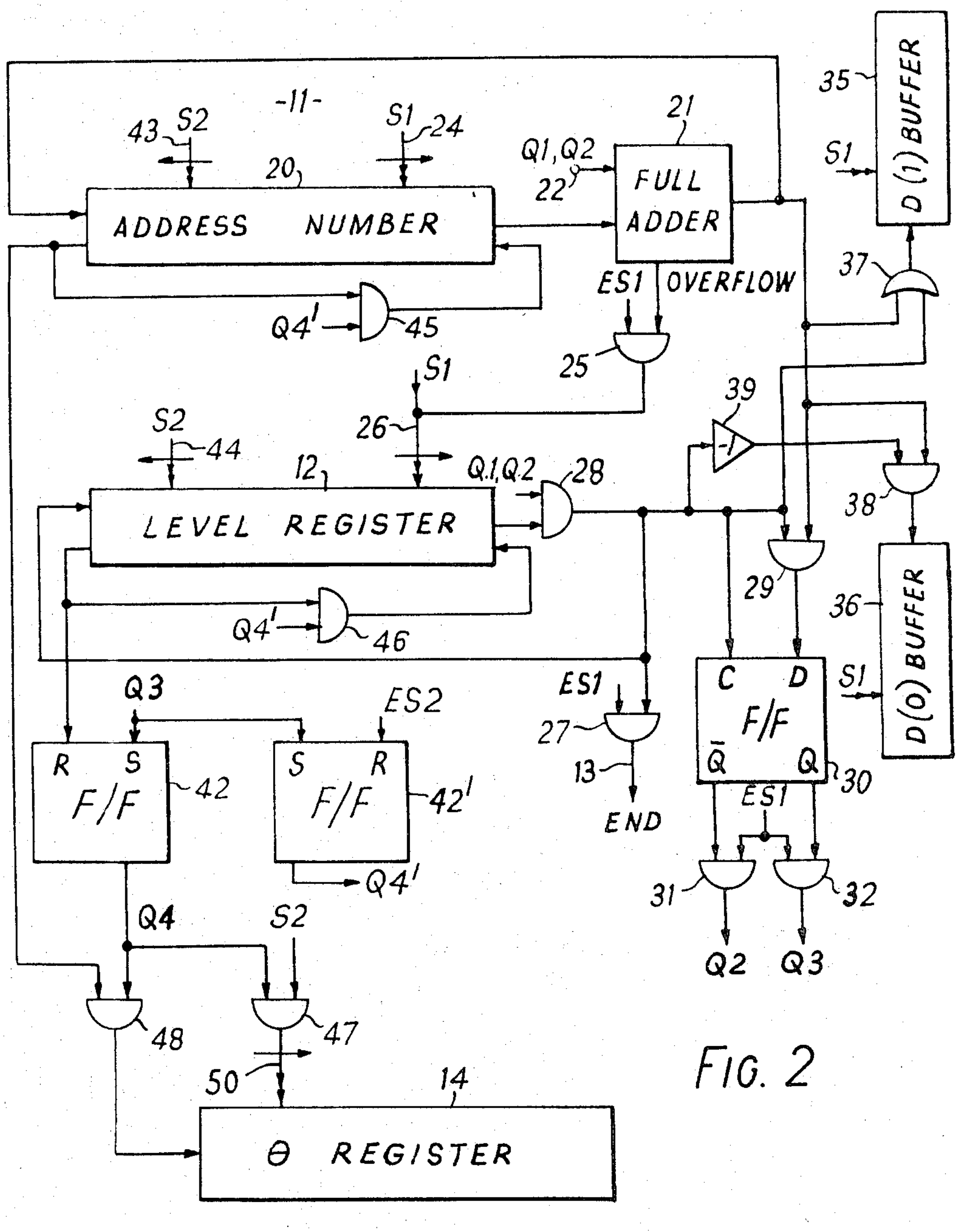
Figure 3:
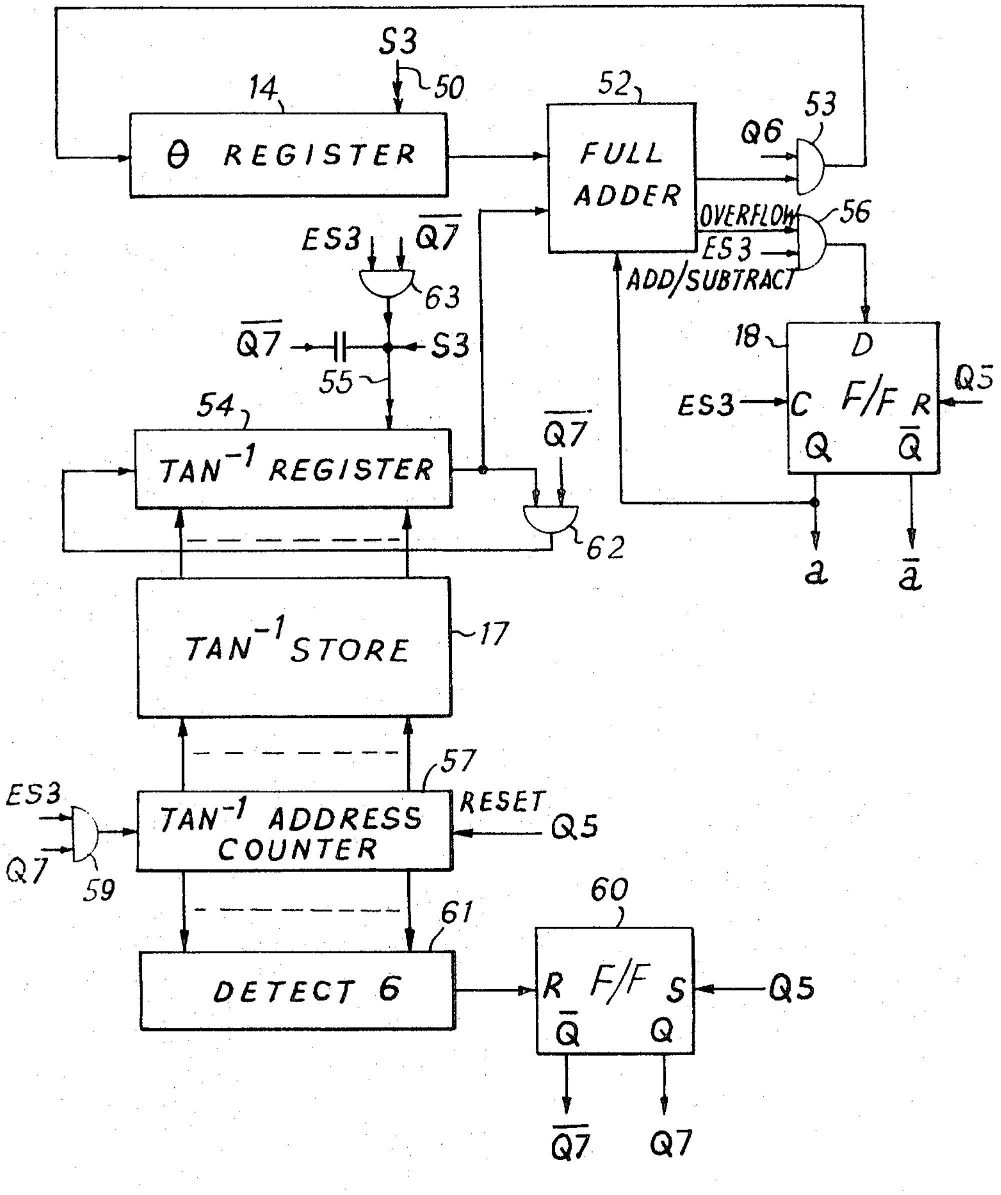
Figure 4:
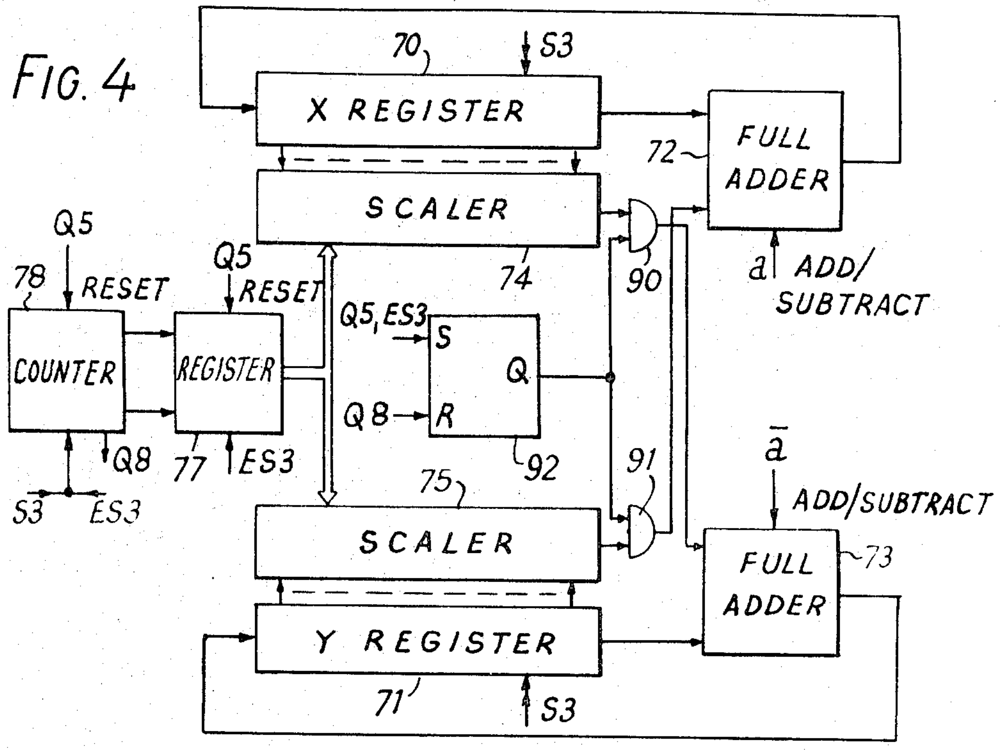
Figure 5:
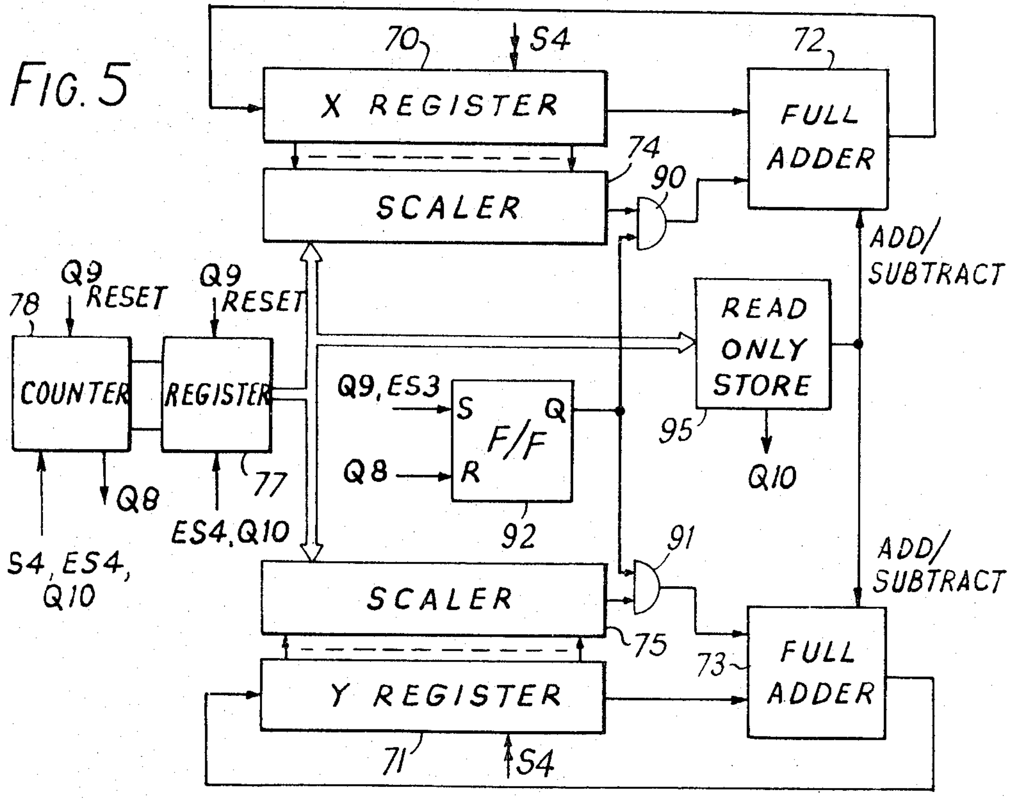
Figure 6:
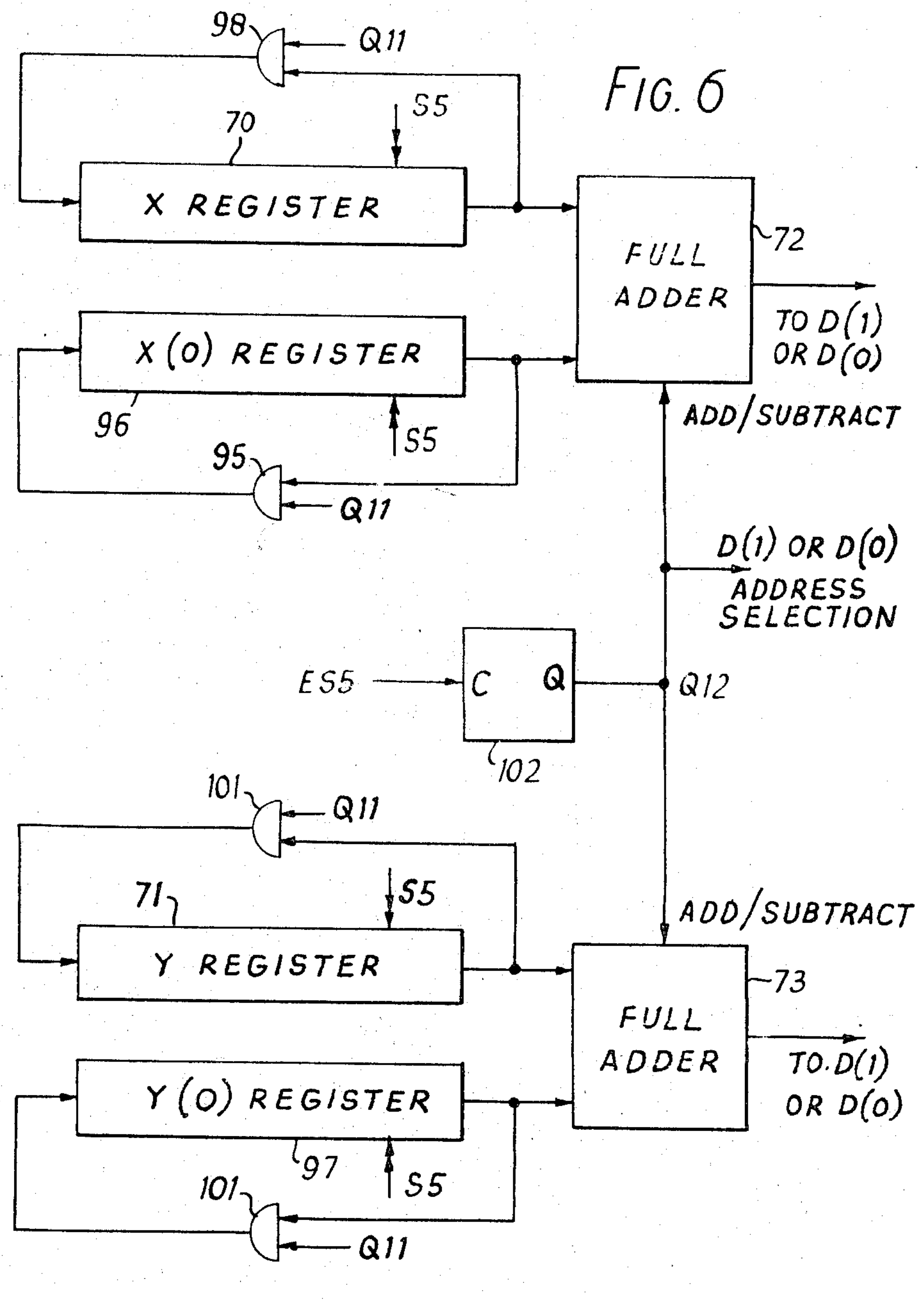

One embodiment of the invention will now be described by way of example, with reference to the accompanying drawings, in which:

FIG. 1 is a schematic drawing of the computer,

FIG. 2 shows the circuits for determining the data address and $\theta$ value for each application of equations (3) and (4), FIG. 3 shows the circuit for determining the values of $a_j$ from the $\theta$ value, FIG. 4 shows a data processor circuit in the configuration for effecting a cordic vector rotation, FIG. 5 shows the processor circuit in the configuration for multiplying by 1/K, and FIG. 6 shows the processor circuit in the configuration for performing equations (8) to (11).

In FIG. 1 a data store 10 initially has the $2^m$ terms $A_0$ of A, entered therein, the real and imaginary parts thereof $X_0$, and $Y_0$, being stored separately. If $A_0$ is real, all $Y_0$ will be zero but, as the computation progresses imaginary parts $Y_1$ $Y_2$, $Y_3$ etc., will appear. At each level of computation the terms are addressed in sequence by an $m$-bit counter (register) 11 in conjunction with an $m$-bit shift register 12 which holds a single bit which identifies the level l. This bit is initially in the most significant stage of the register 12 and is shifted to the next stage each time the counter 11 overflows. Shift inputs to shift registers are identified herein by double-headed arrows. When the single bit shifts back into the most significant stage, an end pulse is emitted on a line 13 to signal that the computation is complete and that the terms in the store 10 are now the required final terms $A_m$.

The bit identified by the register 12 is used to modify the corresponding bit of the address in the register 11 to derive two addresses (. . . 1 . . . ) and ( . . . 0 . . . ), which will be referred to as D(1) and D(0). Also the most significant bits of the register 11, down to that identified by the bit in the register 12, are entered in reverse order in a register 14 to provide the value of $\theta$. In practice a suitable value of $m$ may be 10. For simplicity an example of the addressing will be given with $m = 3$.

| | Counter 11 | D(1) | D(0) | $2^{-1}$ | η $2^{-2}$ | $2^{-3}$ |
|---|---|---|---|---|---|---|
| First level | Number in register 12 is 100. | | | | | |
| | 000 | 100 | 000 | 0 | 0 | 0 |
| | 001 | 101 | 001 | 0 | 0 | 0 |
| | 010 | 110 | 010 | 0 | 0 | 0 |
| | 011 | 111 | 011 | 0 | 0 | 0 |
| | 100 | 100 | 000 | 0 | 0 | 0 |
| | 101 | 101 | 001 | 0 | 0 | 0 |
| | 110 | 110 | 010 | 0 | 0 | 0 |
| | 111 | 111 | 011 | 0 | 0 | 0 |
| Second level | Number in register 12 is 010, | | | | | |
| | 000 | 010 | 000 | 0 | 0 | 0 |
| | 001 | 011 | 001 | 0 | 0 | 0 |
| | 010 | 010 | 000 | 0 | 0 | 0 |
| | 011 | 011 | 001 | 0 | 0 | 0 |
| | 100 | 110 | 100 | 0 | 1 | 0 |
| | 101 | 111 | 101 | 0 | 1 | 0 |
| | 110 | 110 | 100 | 0 | 1 | 0 |
| | 111 | 111 | 101 | 0 | 1 | 0 |
| Third level | Number in register 12 is 001 | | | | | |
| | 000 | 001 | 000 | 0 | 0 | 0 |
| | 001 | 001 | 000 | 0 | 0 | 0 |
| | 010 | 011 | 010 | 0 | 0 | 0 |
| | 011 | 011 | 010 | 0 | 1 | 0 |
| | 100 | 101 | 100 | 0 | 0 | 1 |
| | 101 | 101 | 100 | 0 | 0 | 1 |
| | 110 | 111 | 110 | 0 | 1 | 1 |
| | 111 | 111 | 110 | 0 | 1 | 1 |

It will be noted that, numbers in the counter 11 which differ only by the bit in the place identified by the number in the register lead to the same pair of addresses D(1) and D(0). Measures are taken (and will be described below) to ensure that each pair of addresses is used once only.

The addresses D(1) and D(0) are used to determine the numbers $X_{l-1}(1)$, $Y_{l-1}(1)$, $X_{l-1}(0)$ and $Y_{l-1}(0)$ which are read out of the data store 10 and fed to a processor 15 from which the processed numbers are returned to the store, the re-entry addresses also being specified by D(1) and D(0).

The processor 15 essentially comprises two adders which are used firstly to perform the iterative operations of equations (6) and (7), secondly to perform a multiplication by 1/K and thirdly to perform equations (8) to (11). The performance of equations (6) and (7) requires the multipliers $a_j$ to be determined. This is effected by recirculating the contents of the $\theta$ register 14 through a full adder 16 which, in a manner known per se can be arranged either to subtract or add, being initially set to subtract. The second input to the adder 16 is from a read only memory 17 which stores the values $\tan^{-1}2^{-0}$, $\tan^{-1}2^{-1}$, etc. As each addition or subtraction occurs the overflow bit is monitored and, if this bit is 1 the state of a bistable flip-flop 18 is altered. The two states of this flip-flop correspond respectively to $a_j = -1$ and $a_j = +1$ and additionally correspond respectively to performance of subtraction and addition by the adder 16.

Turning now to FIG. 2, the derivation of D(1), D(0) and $\theta$ will be considered in more detail. The counter 11 consists of a reversible shift register 20 connected in a loop via a full adder 21 which increments the number in the register 20 by 1 when an increment signal Q1 is applied to a terminal 22. Such a signal is applied each time the processor 15 of FIG. 1 is ready to operate on the next two terms and causes the application of shift pulses S1 to a right shift input 24, thereby causing one complete recirculation of register and consequent incrementation of the contents thereof. A signal ES1 marking the end of the shift pulse train opens a gate 25 to test if overflow of the counter 11 has occurred; if so a right shift pulse is applied to a shift input 26 to the register 12. Simultaneously a gate 27 tests to see whether the computation has been completed and, if so, provides the end signal on line 13.

The shift pulses S1 are also applied to the right shift input 26 to the register 12 to recirculate the contents thereof through a gate 28 opened by the increment signal Q1. The outputs of the two shift registers recirculating in synchronism are applied to a gate 29 which tests whether the bit in the register 20 at the same position as the single bit in the register 12 is a 1 or 0; if it is a 0 the addresses D(1) and D(0) are not used in order to avoid duplication of addresses. To this end the output of the gate 29 is applied to a D-type flip-flop 30 whose clock input is clocked by the single bit in the register 12. At the end of the recirculation the signal ES1 monitors the state of the flip-flop 30. If $\overline{Q} = 1$, a gate 31 passes a signal Q2 which functions as the signal Q1 and immediately institutes a further cycle of the shift registers. If however $Q = 1$, a signal Q3 is generated by a gate 32 and used as described below.

As the shift registers 12 and 20 recirculate, their contents are used for form D(1) and D(0) in two buffer registers 35 and 36. The bits of the number in the register 20 plus the 1 bit in the register 12 enter the D(1) register 35 through an OR gate 37. The bits of the number in the register 20 enter the D(0) register 36 through an AND gate 38 to which the output of the register 12, inverted by an inverter 39, is also applied.

The abovementioned signal Q3 is used to initiate the entry of $\theta$ in the register 14 by setting a bistable flip-flop 42 and initiating a shift pulse train S2 which is applied to left shift inputs 43 and 44 of the registers 20 and 12 to cause them to effect complete reverse recirculations via gates 45 and 46, which are opened by the Q output of a flip-flop 42', identified as Q4'. The Q output Q4 of the flip-flop 42 opens gates 47 and 48. The gate 47 allows the shift pulses S2 to pass to a right-shift input 50 of the register 14 and the gate 48 allows the bits coming out the register 20 in reverse order to enter the register 14 in normal order. When the single 1 bit in the register 12 appears, the flip-flop 42 is reset to freeze the value of $\theta$ in the register 14 (although the registers 20 and 12 complete their recirculations).

When the reverse recirculation has been completed a signal Q5 is generated and the computer proceeds to determine $a_0$ as will now be described with reference to FIG. 3.

FIG. 3 shows the $\theta$ register 14 connected in a recirculating loop via a full adder 52 and a gate 53 which is opened by a signal Q6 only during each train of shift pulses S3 applied to the right shift input 50 to effect a complete recirculation of the register. The full adder is used either to subtract or add the contents of a further shift register 54 from the contents of the register 14, $\tan^{-1}2^{-j}$ being held in the register 54 and the pulses S3 being applied to a right-shift input 55 thereof.

Initially the signal Q5 resets a J-K flip-flop, constituting the bistable 18 of FIG. 1, which provides a signal $a$ on its Q output. When $a = 1$, $a_j = +1$. When the signal $\overline{a}$ on its $\overline{Q}$ output is $\overline{a} = 1$, then $a_j = -1$. The signal $a$ controls the full adder 52 so that when $a = 1$ the adder adds and when $a = 0$ the adder subtracts.

At the end of each shift pulse train S3 an end of train signal ES3 monitors the overflow bit via a gate 56 whose output is applied to the D input of the flip-flop 18. This flip-flop sets $Q = 0$ every time an overflow bit appears, being clocked by the signal ES3.

The values of $\tan^{-1}2^{-0}$ to $\tan^{-1}2^{-5}$ are transferred to the register 54 from the read only memory or store 17 which is addressed by a small counter 57. This counter is reset to zero by the signal Q5 which marks the end of the determination of D(1), D(0) and $\theta$ and thus addresses $\tan^{-1}2^{-0}$ and transfers the value thereof to the register 54. Each end of train signal ES3 increments the counter 57, so long as a gate 59 is open, and thus transfers the successive values of $\tan^{-1}2^{-1}$, $\tan^{-1}2^{-2}$ and so on to the register 54.

The gate 59 is enabled by the Q output Q7 of a set-reset bistable flip-flop 60, this being set by the signal Q5, and reset by a circuit 61 which detects when the counter has counted up to six. When the flip-flop 60 resets, a pulse from its $\overline{Q}$ output $\overline{Q7}$ causes an extra shift of the register 54 which is now closed in a loop through a gate 62 enabled by $\overline{Q7}$. This has the effect of dividing the contents of the register 54, namely $\tan^{-1}2^{-5}$, by two to form $\tan^{-1}2^{-6}$ as $1/2 \tan^{-1}2^{-5}$. The $\overline{Q7}$ output of the flip-flop 60 also enables a gate 63 through which subsequent pulses ES3 pass to effect the extra shift, whereby each new value of $\tan^{-1}2^{-j}$ is formed by dividing the previous value by two.

In the following description it is assumed that each value of $a_j$ is used in the simultaneous implementation of equations (6) and (7). It is also possible to form all the values of $a_j$, buffer them and then implement equations (6) and (7).

Equations (6) and (7) are implemented by the processor 15 of FIG. 1 which is shown in more detail in FIG. 4. In FIG. 4 the values of $X_{i-1}(1)$ and $Y_{i-1}(1)$ as addressed by D(1) are transferred, using well known techniques, from the data store 10 (FIG. 1) into X and Y registers 70 and 71. The registers 70 and 71 are connected in recirculating loops through respective full adders 72 and 73 which add to or subtract from the contents of each register the contents of the other register scaled down by respective scalers 74 and 75. The scalers are commercially available circuits which select an output from the corresponding shift register in accordance with an address buffered in a register 77. When the address is zero (i.e., $j=0$) the least significant stage is selected and hence $X_j$ is combined with $Y_j$ unscaled and $Y_j$ is combined with $X_j$ unscaled. When $j=1$, the second least significant stage is selected and hence $X_j$ is combined with $1/2\ Y_j$ and $Y_j$ is combined with $1/2\ X_j$, and so on. In this way the scaling factor $2^{-j}$ in equations (6) and (7) is introduced.

Whether any combination is additive or subtractive depends on the value of $a_j$ and therefore the signal $\underline{a}$ from FIG. 3 is used to determine whether the adder 72 adds or subtracts and the signal $\bar{a}$ is used to determine whether the adder 73 adds or subtracts.

The scaler address register 77 is controlled by a recirculating counter 78 with a capacity of P equal to the number of bits in each value X and Y, which may be 16 for example. The counter 78 counts the shift pulses S3 which are applied to the shift registers 70 and 71. Initially the signal Q5 resets both counter 78 and register 77 to zero for $j=0$. At the end of the first recirculation the counter 78 is back to zero but is incremented to 1 by the end of train pulse ES3. Each such pulse transfers to the register 77 the new value in the counter 78, this value remaining unchanged until the next pulse ES3.

The counter 78 is used in ensuring that only P-J bits pass from the scalers 74 and 75 to the adders 73 and 72 respectively through gates 90 and 91 respectively. (The last $j$ bits are the least significant bits of the new value of $X_{j+1}$ or $Y_{j+1}$ entering the register 70 or 71 from the adder 72 or 73). The gates 90 and 91 are opened by a bistable flip-flop 92 which is set by the pulse Q5 and each pulse ES3 and reset by a signal Q8 when the counter 78 reaches the value P.

When P complete recirculations of the circuits of FIGS. 3 and 4 have been effected by P trains of pulses S3, a further sequence of trains of pulses S4 is used to multiply the numbers $KX^1$ and $KY^1$ now in the registers 70 and 71 by 1/K. These trains are preceded by a pulse Q9 and each is succeeded by a pulse ES4. The circuit of FIG. 4 is switched to the configuration shown in FIG. 5 in which the outputs of the gates 90 and 91 are connected to the adders 72 and 73 respectively. By selectively adding and subtracting the scaled values from the X and Y registers to the contents of the same registers the contents thereof are multiplied by 1/K. The sequence of adding and subtracting operations necessary to achieve the required value of K is determined by a small read only store 95 controlled by the register 77 and whose output controls the add/subtract input of both adders 72 and 73. In this operation neither addition nor subtraction will be necessary for some values of $j$ and for such values the store 95 provides an output signal Q10 which immediately steps on the counter 78 and puts the new value of $j$ in the register 77. Thus recirculations under the action of pulses S4 are only effected for values of $j$ which require an adding or subtracting operation. This minimises the time taken for multiplying by 1/K.

It can be shown that $$K=\sqrt{(1+1)(1+1/4)(1+1/16)\cdots(1+2^{-2m})}$$

The final operations are those of equations (8) to (11). These are performed using the registers 70 and 71 which now hold $X^1(1)$ and $Y^1(1)$ and registers 96 and 97 which have X(0) and Y(0) entered therein under the control of D(0). The registers are shifted through closed loops established by gates 98, 99, 100 and 101, all enabled by a signal Q11, under the control of shift pulses S5 followed by end of train pulses ES5 which clock a flip-flop 102, causing this flip-flop alternately to be true and false. The Q output Q12 of the flip-flop 102 causes the adders 72 and 73 to add (for equations (8) and (9) ) and subtract (for equations (10) and (11)) alternately. The signal Q12 also operates in conjunction with the D(1) and D(0) registers 35 and 36 (FIG. 2) to ensure that $X_l(0)$ and $Y_l(0)$ are returned to the address D(0) in the store 10 and that $X_l$ and $Y_l$ are returned to the address D(1).

At the end of two trains of pulses S5 the next signal Q1 is given to select the next address and recommence the sequence of operations described.

The processor 15 is of course switched to the configurations of FIGS. 4, 5 and 6 by means of appropriate gates controlled by the overall sequencing and timing circuits, illustrated simply as a block 105 in FIG. 1.

What we claim is:

1. A special purpose digital computer for implementing the fast Fourier transform, the computer comprising:

a data store for storing the real and imaginary parts $X_{l-1}$ and $Y_{l-1}$ of the terms $A_{l-1}$;

an address register for storing the address of a term;

pulse generator means connected to said address register for progressively stepping the stored address cyclically through all values thereof during each level of computation;

a level register for storing a bit identifying the level l of the computation;

means responsive to each stored address in said address register and the level bit in said level register to extract the values $X_{l-1}(1)$, $Y_{l-1}(1)$, $X_{l-1}(0)$ and $Y_{l-1}(0)$ from said data store and for producing a signal representative of the value of $\theta$ from the most significant bits of the stored address;

means connected to said means for extracting and producing thereby to receive said extracted values $X_{l-1}(1)$ and $Y_{l-1}(1)$ and said signal representative of the value of $\theta$ for effecting vector rotation of said values $X_{l-1}(1)$ and $Y_{l-1}(1)$ through an angle having said value of $\theta$, said means for effecting rotation including means for operating iteratively upon the values $X_{l-1}(1)$ and $Y_{l-1}(1)$ to compute values $KX^1_{l-1}(1)$ and $[KX^1_{l-1}(1)]$ $KY^1_{l-1}(1)$ where K is a constant and $X^1+iY^1=(X+iY)\,\mathrm{Exp}(2\pi i\theta)$, said iterative operations being of the form $$X_{j+1}=X_j+a_j2^{-j}Y_j \tag{6}$$

$$Y_{j+1}=Y_j-a_j2^{-j}X_j \tag{7}$$

where the multipliers $a_j$ change between +1 and −1 so that $$\overline{\left(\theta-\frac{1}{4}\right)+\sum_{j=0}^{P}a_j\tan^{-1}2^{-j}}$$

tends towards zero;

means connected to said means for effecting vector rotation thereby to receive said computed values of $KX^1_{l-1}(1)$ and $KY^1_{l-1}(1)$ for removing the constant K to derive values $X^1_{l-1}(1)$ and $Y_{l-1}(1)$;

and means responsive to said derived values $X^1_{l-1}(1)$ and $Y^1_{l-1}(1)$ from said means for removing the constant K for performing the following additions and subtractions:

$$X_l(0) = X_{l-1}(0) + X^1_{l-1}(1) \quad (8)$$

$$Y_l(0) = Y_{l-1}(0) + Y^1_{l-1}(1) \quad (9)$$

$$X_l(1) = X_{l-1}(0) - X^1_{l-1}(1) \quad (10)$$

$$Y_l(1) = Y_{l-1}(0) - Y^1_{l-1}(1) \quad (11)$$

2. A digital computer according to claim 1, wherein the means for operating iteratively further includes a store holding the first values only of $\tan^{-1}2^{-j}$ and means connected to said store for repeatedly dividing by two the preceding values in order to derive subsequent values.

3. A digital computer according to claim 1, wherein said address register and said level register are both shift registers, and wherein there is further provided an adder; means for connecting said address register in a recirculating loop including said adder for incrementing the address by 1 in each recirculation; and means for connecting said level register in a recirculating loop to recirculate in step with said address register.

4. A digital computer according to claim 3, wherein said means for extracting and producing further comprises first and second buffer registers for holding the addresses of $X_{l-1}(0)$ and $Y_{l-1}(0)$ on the one hand and $X_{l-1}(1)$ and $Y_{l-1}(1)$ on the other hand; means for shifting the address in said address register into both said first and second buffer registers; and means for forcing the bit corresponding to the 1 bit in said level register to 0 in said first buffer register and to 1 in said second buffer register under control of said level register.

5. A digital computer according to claim 3, wherein said means for producing the value of $\theta$ includes a shift register for storing $\theta$, means for synchronous reverse circulation of said address register and said level register, means for shifting bits from said address register into said shift register for storing $\theta$, and means stopping said means for shifting bits when the 1 bit in the level register is detected.

6. A digital computer according to claim 3, further comprises means responsive to overflow of said address register for shifting the 1 bit in said level register to the next less significant position.

7. A digital computer according to claim 3, wherein said means for recirculating further comprises means for detecting, during the incrementing recirculation of the address, when the bit in said address register located in the same position as the 1 bit in said level register has a predetermined one of its two possible values and wherein said means for detecting is operative to institute immediately a further incrementing recirculation without performance of equations (6) to (11).

8. A digital computer according to claim 1, wherein said means for producing the value of 0 includes a register holding (0—¼), and wherein said means for operating iteratively comprises control means for adding to or subtracting from the contents of said register for holding $(\theta - \frac{1}{4})$ the values of $\tan^{-1}2^{-j}$ in accordance with the values of $a_j$, said control means being responsive to the values of $$\left(\theta-\frac{1}{4}\right)+\sum_{j=0}^{P} a_j \tan^{-1} 2^{-j}$$

thereby created to determine the values of $a_j$ such that the values of $$\left(\theta-\frac{1}{4}\right)+\sum_{j=0}^{P} a_j \tan^{-1} 2^{-j}$$

tend progressively towards zero.

9. A digital computer according to claim 1, wherein said means for operating iteratively includes means for counting the iterative operations, first and second shift registers for storing X and Y values, respectively, first and second adder/subtractors connected in recirculating loops including said first and second shift registers, respectively, first and second scalers connected between said first and second shift registers each being connected to the respective non-corresponding one of said first and second adder/subtractors wherein said first and second scalers are controlled by said means for counting so as to introduce the multipliers $2^{-j}$ in equations (6) and (7), and means for controlling the add and subtract functions of said first and second adder/subtractors to add and subtract selectively in dependence upon the values of $a_j$.

10. A digital computer according to claim 9, wherein the means for removing the constant K further comprises means for connecting said first and second scalers to the corresponding said first and second adder/-subtractors and means for recirculating said first and second shift registers wherein said first and second scalers progress through states of different significance while said first and second adder/subtractors are caused to add and subtract in a predetermined sequence, such that $KX_l^1(1)$ and $KY_l^1(1)$ are both multiplied by 1/K.

11. A special purpose computer for performing the fast Fourier transform on a plurality of data terms in a succession of levels of computation, the number of levels being dependent upon the number of the data terms to be transformed, the computer comprising:

i. data storage means for storing each data term at a predetermined address therein;

ii. means for extracting data terms in pairs from said data storage means, the data term pairs being determined in accordance with the level of computation and with their addresses in said data storage means;

iii. a central processor arranged, at each level of computation, to receive the pairs of terms extracted from said data storage means said central processor including means for effecting vector rotation of one of the terms of each pair through an angle determined by the addresses of the terms of the pair and the level of computation, and means for adding and subtracting the result of the vector rotation to the other term to form a new pair of terms; and iv. means for returning each new pair of terms to said data storage means, to the respective addresses of the pair of terms from which the new pair of terms was derived; wherein said means for effecting vector rotation comprises:

a. means for subjecting the real and imaginary parts, X and Y respectively, of said one tem of each pair to a succession of rotational steps, of which the first step is of magnitude ¼ radians/2$\pi$ and the remaining steps are of magnitude $a_j$ tan $^{-1}2^{-j}$ radians/2$\pi$ and are constituted by a series of iterative operations of the form $$X_{j+1} = X_j + a_j\, 2^{-j} Y_j \qquad (6)$$

$$Y_{j+1} = Y_j - a_j\, 2^{-j} X_j \qquad (7)$$

where the multipliers $a_j$ change between +1 and −1 in such a manner that the algebraic sum of said rotational steps and the respective angle through which vector rotation is to be effected tends to zero, whereby to effect said vector rotation and simultaneously to effect multiplication by a constant K; and b. dividing means for dividing the result of said iterative operations by said constant K.

* * * * *

UNITED STATES PATENT OFFICE

CERTIFICATE OF CORRECTION

Patent No. 3,767,905 Dated October 23, 1973

Inventor(s) DOUGLAS GARDE

It is certified that error appears in the above-identified patent and that said Letters Patent are hereby corrected as shown below:

In the Abstract:

Rewrite abstract as follows:

The fast Fourier transform is a known algorithm which can be written:

$$A_{\ell}(b_{m-1}\ b_{m-2} \ldots b_{m-\ell} \ldots b_1\ b_0) =$$

$$\frac{1}{c}\Big[A_{\ell-1}(b_{m-1}\ b_{m-2} \ \cdots\ 0 \ldots b_1 b_0)$$

$$+ A_{\ell-1}(b_{m-1}\ b_{m-2} \ \cdots\ 1 \ \ldots\ b_1 b_0)\ \text{Exp.}\ (2\pi i \Theta')\Big]$$

where $\Theta'$ is in radians/$2\pi$ and is given by $$\Theta' = \pm\ (b_{m-1}\ 2^{-\ell} + b_{m-2}\ 2^{-\ell+1} + \ldots + b_{m-\ell}\ 2^{-1})$$

where $A_0$ is the set of $N = 2^m$ input data points identified by m indices $b_{m-1}$ to $b_o$ and where $b_{m-\ell} = 0$ or 1. The computation proceeds in a series of levels $1 \ldots \ell \ldots m$ at each of which the above equation represents $2^{m-1}$ equations corresponding to all different combinations of bits b other than $b_{m-1}$. The terms $A_1$ become complex. $A_{m-\ell}$ gives the required terms of the Fourier series. This algorithm is engineered economically by subjecting the term $A_{\ell-1}$ (...1...) to vector rotation through the angle $2\pi\Theta$ where $\Theta = \pm(\Theta' - \frac{1}{2})$

PO-1050 (5/69)

UNITED STATES PATENT OFFICE
CERTIFICATE OF CORRECTION

Patent No. 3,767,905 Dated October 23, 1973

Inventor(s) DOUGLAS GARDE

It is certified that error appears in the above-identified patent and that said Letters Patent are hereby corrected as shown below:

and then adding and subtracting them from the terms $A_{\ell-1}$ (...0 ...) to generate $A_\ell$ '(... 1 ...) and $A_1$ (... 0 ...). To avoid the need for a large lookup store giving all required values of sin Θ and cos Θ, as is necessary in direct vector rotation, the rotation is effected by the so-called CORDIC computation(pseudo-multiplication).If the vector $A_{\ell-1}$(... 1 ...) to be rotated is represented as X+iY,it can be shown that the operator -- $\prod_{j=0}^{p-1} (1 + ia_j 2^{-j})$ -- is equivalent to the operator $K_e^{2\pi i\Theta''}$ where K is a readily removed constant of multiplication and -- $2\pi\Theta'' = \pm 2\pi (\Theta - \frac{1}{4}) = \sum_{j=0}^{m-1} a_j \tan^{-1} 2^{-j}$ --;

Thus the required angle of rotation Θ (in radians/2π)

$$= b_{m-1} 2^{-\ell} + b_{m-2} 2^{-\ell + 1} + \ldots + b_{m-\ell + 1} 2^{-2}$$

is stored, the vector X + iY after an initial 90° rotation step is multiplied by successive terms $(1 + ia_j 2^{-j})$, and $a_j \tan^{-1} 2^{-j}$ is added to or subtracted from the stored angle, in accordance with whether $a_j$ is +1 or -1 and the value of $a_j$ is changed from the existing to the other value when the stored angle goes through zero. A lookup store for $\tan^{-1} 2^{-j}$ is required but only five words have to be stored because, for j>1, $\tan^{-1} 2^{-j}$

PO-1050
(5/69)

UNITED STATES PATENT OFFICE
CERTIFICATE OF CORRECTION

Patent No. 3,767,905 Dated October 23, 1973

Inventor(s) DOUGLAS GARDE

It is certified that error appears in the above-identified patent and that said Letters Patent are hereby corrected as shown below:

is approximated sufficiently closely by $2^{-j}$.

UNITED STATES PATENT OFFICE

CERTIFICATE OF CORRECTION

Patent No. 3,767,905 Dated October 23, 1973

Inventor(s) DOUGLAS GARDE

It is certified that error appears in the above-identified patent and that said Letters Patent are hereby corrected as shown below:

In the Claims:

Column 8, line 55, amend to read -- $KX'_{\ell-1}$ (1) and $KX'_{\ell-1}$ (1) $KY'_{\ell-1}$ (1) where K is a --.

Column 9, line 60, change "comprises" to --comprising--.

Column 10, line 6, change "0" to --Θ --.

Column 10, line 7, change "(0 - 1/4)" to -- (Θ - 1/4)--

Column 11, line 14 change "tem" to --term--.

Signed and Sealed this

*twenty-third* Day of *September 1975*

[SEAL]

*Attest:*

RUTH C. MASON
*Attesting Officer*

C. MARSHALL DANN
*Commissioner of Patents and Trademarks*